US012780745B2

(12) United States Patent
Konopaske et al.

(10) Patent No.: US 12,780,745 B2
(45) Date of Patent: Nov. 3, 2026

(54) METHOD FOR BRAIDING AUTOMATION FOR CERAMIC MATRIX COMPOSITES

(71) Applicant: Raytheon Technologies Corporation, Farmington, CT (US)

(72) Inventors: Zachary Paul Konopaske, West Hartford, CT (US); John D. Riehl, Hebron, CT (US); Andrew Joseph Lazur, La Jolla, CA (US); Brendan Lenz, North Branford, CT (US)

(73) Assignee: RTX Corporation, Farmington, CT (US)

( * ) Notice: Subject to any disclaimer, the term of this patent is extended or adjusted under 35 U.S.C. 154(b) by 541 days.

(21) Appl. No.: 18/200,185

(22) Filed: May 22, 2023

(65) Prior Publication Data

US 2024/0391837 A1 Nov. 28, 2024

(51) Int. Cl.
*C04B 35/628* (2006.01)
*C04B 35/634* (2006.01)
(Continued)

(52) U.S. Cl.
CPC ........ *C04B 35/80* (2013.01); *C04B 35/62884* (2013.01); *C04B 35/62886* (2013.01); *C04B 35/62892* (2013.01); *C04B 35/63416* (2013.01); *C04B 35/6342* (2013.01); *C04B 35/64* (2013.01); *D04C 3/40* (2013.01); *C04B 2235/5244* (2013.01); *C04B 2235/5256* (2013.01); *C04B 2235/614* (2013.01); *C04B 2235/616* (2013.01); *D10B 2101/16* (2013.01); *D10B 2505/02* (2013.01)

(58) Field of Classification Search
CPC ........................................................ D04C 3/40
See application file for complete search history.

(56) References Cited

U.S. PATENT DOCUMENTS 5,127,783 A * 7/1992 Moghe .................. F16B 33/006 411/908
5,203,249 A * 4/1993 Adams ..................... D04C 3/36 87/34

(Continued)

FOREIGN PATENT DOCUMENTS

DE 102010055248 B4 3/2014
EP 4144709 A1 3/2023

(Continued)

OTHER PUBLICATIONS

F. C. Campbell, “Liquid Molding: You Get a Good Preform and Tool . . . You Get a Good Part”, Manufacturing Processes for Advanced Composites, Jan. 1, 2004, 54 pages (Year: 2004).*

(Continued)

*Primary Examiner* — Xiao S Zhao
*Assistant Examiner* — Nicholas J Chidiac
(74) *Attorney, Agent, or Firm* — Kinney & Lange, P.A.

(57) ABSTRACT

A system for forming a braided preform includes a mandrel having a rotational axis, the mandrel being translatable along and rotatable about the rotational axis, a radial braider for winding fibers onto the mandrel to form a braided layer, an applicator for applying a polymer binder to the braided layer while mounted on the mandrel, and a debulking tool for debulking the braided layer while mounted on the mandrel.

14 Claims, 3 Drawing Sheets

(51) Int. Cl.

| | |
|---|---|
| ***C04B 35/64*** | (2006.01) |
| ***C04B 35/80*** | (2006.01) |
| ***D04C 3/40*** | (2006.01) |

(56) References Cited

U.S. PATENT DOCUMENTS

| | | | | |
|---|---|---|---|---|
| 8,690,962 | B2 * | 4/2014 | Dignam | B29C 70/222<br>87/9 |
| 9,434,111 | B2 | 9/2016 | Mathon et al. | |
| 9,827,710 | B2 * | 11/2017 | Rossi | B29C 65/72 |
| 10,744,722 | B2 * | 8/2020 | Rossi | B29D 99/0014 |
| 11,572,644 | B2 * | 2/2023 | Ogale | F16L 11/085 |
| 2012/0179272 | A1 * | 7/2012 | Dignam | A61F 2/5046<br>87/8 |
| 2015/0217508 | A1 * | 8/2015 | Rossi | D04C 1/06<br>428/80 |
| 2018/0065314 | A1 * | 3/2018 | Rossi | B29C 33/448 |
| 2020/0407894 | A1 * | 12/2020 | Ogale | D04C 3/40 |
| 2023/0065975 | A1 | 3/2023 | Read et al. | |
| 2023/0366467 | A1 * | 11/2023 | Palaparthi | F16J 15/328 |

FOREIGN PATENT DOCUMENTS

| | | | | |
|---|---|---|---|---|
| WO | WO-2012083921 | A1 * | 6/2012 | C04B 35/14 |
| WO | 2020209848 | A1 | 10/2020 | |

OTHER PUBLICATIONS

Extended European Search Report for EP Application No. 24175840.8, dated Oct. 14, 2024, 11 pages.

F. C. Campbell, "Liquid Molding: You Get a Good Preform and Tool . . . You Get a Good Part", Manufacturing Processes for Advanced Composites, Jan. 1, 2004, 54 pages.

* cited by examiner

METHOD FOR BRAIDING AUTOMATION FOR CERAMIC MATRIX COMPOSITES

BACKGROUND

The present invention relates to ceramic matrix composites (CMCs) and, more particularly, to the manufacturing of fibrous ceramic preforms.

Braiding is one technique for preparing fibrous preforms which wraps/winds fibers onto a mandrel in a continuous manner, allowing for the formation of continuous, rather than disjointed final components with reduced mechanical properties. It also allows for customization of the amount of fiber reinforcement in the axial or circumferential directions based on the braiding parameters. Braiding is, however, a costly means for producing preforms due to the amount of manual intervention needed to carry out braiding, transition to post-processing steps (e.g., debulking), and perform quality control. The addition of other desirable supplemental materials (e.g., binders) requires further manual intervention. Thus, a more efficient means for producing a high volume of braided preforms is desirable.

SUMMARY

A system for forming a braided preform includes a mandrel having a rotational axis, the mandrel being translatable along and rotatable about the rotational axis, a radial braider for winding fibers onto the mandrel to form a braided layer, an applicator for applying a polymer binder to the braided layer while mounted on the mandrel, and a debulking tool for debulking the braided layer while mounted on the mandrel.

A method of forming a ceramic matrix composite includes winding a plurality of fibers from a radial braider around a mandrel to form a braided layer, cutting the plurality of fibers to release the braided layer from the radial braider, applying a polymer binder to the braided layer while on the mandrel, translating a debulking tool toward the mandrel to converge around the mandrel, and debulking the braided layer.

A system for forming a braided preform includes a mandrel having a rotational axis, the mandrel being translatable along and rotatable about the rotational axis, a driven device for translating and rotating the mandrel, a radial braider for winding fibers onto the mandrel to form a braided layer, an applicator for applying a polymer binder to the braided layer while mounted on the mandrel, and a debulking tool for debulking the braided layer while mounted on the mandrel.

Figure 1:
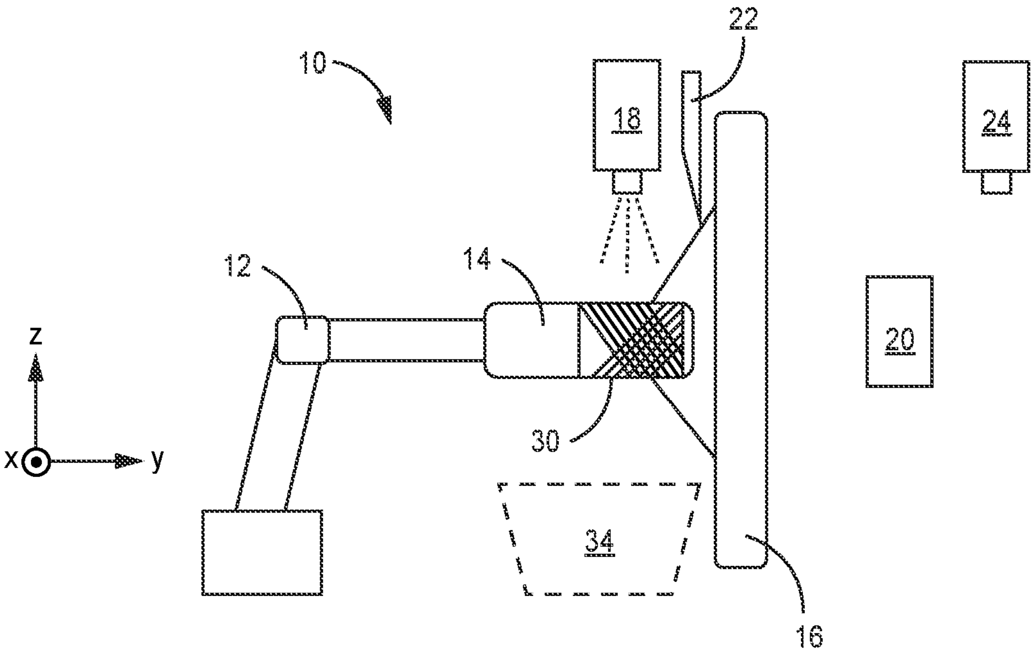
FIG. 1 is a schematic illustration of an automated braiding system.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents an enhanced system for producing braided CMC components. The system is referred to as "enhanced" because it incorporates other preform processing features besides braiding, such as binder wetting, and debulking, which can also be automated. Preforming with the disclosed system therefore requires less manual labor and processing time.

Figure 2:
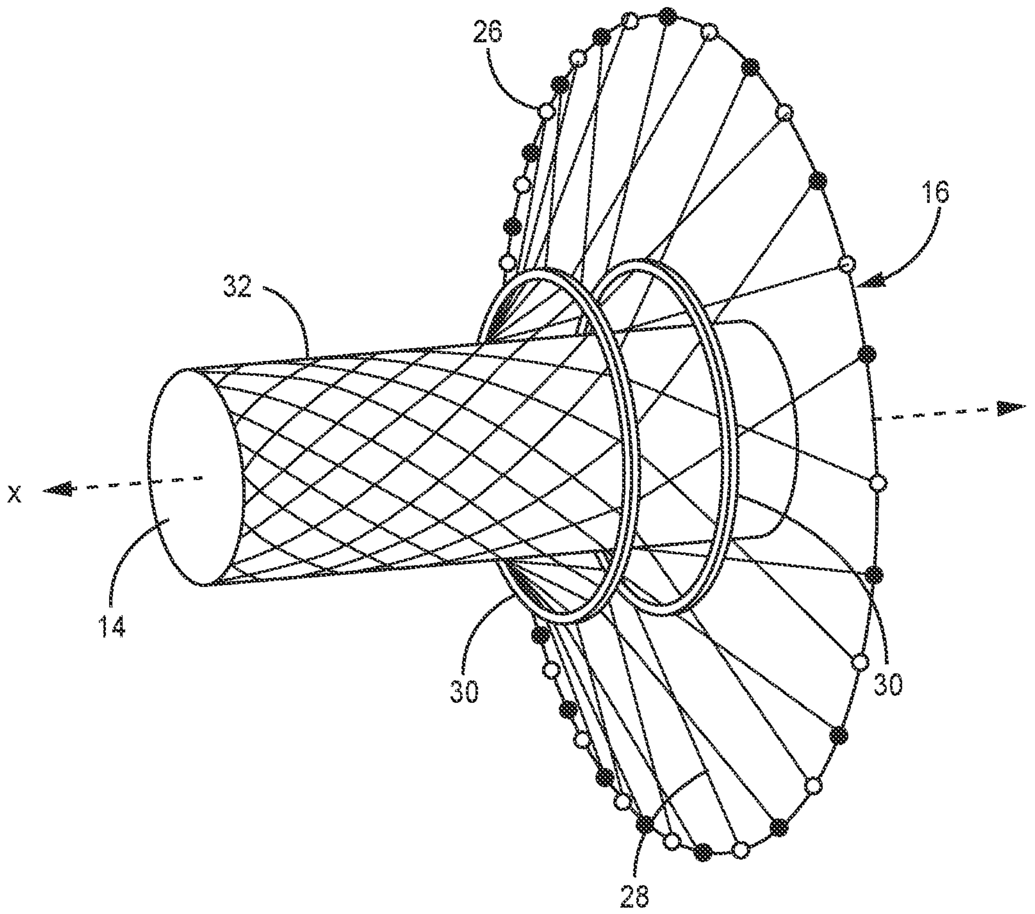
FIG. 2 is a perspective view of a radial braider and mandrel of the automated braiding system.
Figure 3:
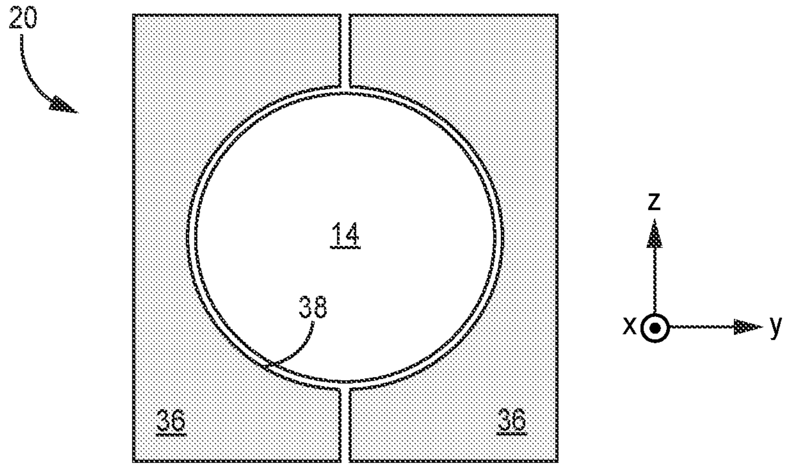
FIG. 3 is a simplified end view of a debulking tool of the automated braiding system.

FIG. 1 is a simplified illustration of enhanced automated braiding system 10. FIG. 2 is a perspective view of radial braider 16 and mandrel 14 of system 10. FIG. 3 is a simplified end view of debulking tool 20 of system 10. FIGS. 1, 2, and 3 are discussed together.

System 10 includes robotic arm 12, mandrel 14, radial braider 16, applicator 18, debulking tool 20, cutting device 22, and optical device 24. Mandrel 14 can be removably connected to robotic arm 12, which can rotate mandrel 14 about the x-axis, and translate generally in three dimensions. For example, robotic arm 12 can move mandrel 14 along the x-axis from one side of radial braider to the other in some embodiments. In alternative embodiments, robotic arm 12 can be replaced with a translatable guide rail, or some other pneumatically and/or hydraulically driven device capable of positioning mandrel 14 as required. Although shown as a cylinder with a circular cross-sectional geometry, mandrel 14 can have other three-dimensional geometries forming other cross-sectional shapes, such as square, rectangular, triangular, elliptical, and airfoil, to form preforms with a corresponding geometry. Radial braider 16 carries spools 26 of warp and weft fibers 28 in a spool plane, or as illustrated, the y-z plane. Fibers 28 can be formed from silicon carbide (SiC) or other suitable ceramic material. Two guide rings 30 guides fibers 28 onto mandrel 14 to form braided layer 32. Such a double ring configuration can allow for braiding in both directions along the x-axis, which can make the braiding process more efficient. Alternative embodiments can include a single guide ring 30. One or more layers 32 can be braided to form a preform.

Applicator 18 can be used to apply a polymer binder to braided layer 32. Exemplary binders can include solutions of polyvinyl alcohol (PVA) in water, or polyvinyl butyral (PVB) in an alcohol (e.g., ethanol) solvent, or other suitable solvent. The binder can further include ceramic particles (e.g., one or more of silicon carbide, boron carbide, silicon nitride, pure silicon, pure carbon, aluminum oxide, and hafnia) intended to remain as part of the preform through matrix formation and help enhance matrix formation and fortify the resultant CMC. Applicator 18 can operate to spray the binder or apply droplets to braided layer 32. Binder application can occur during braiding, after completion of a braided layer 32, or after completion of a preform of multiple braided layers 32. In an alternative embodiment, the binder can be applied by immersing braided layer 32 into bath 34 (shown in dashed lines) of binder. In such case, robotic arm 12 can immerse mandrel 14 containing braided layer(s) 32 into bath 34.

Debulking tool 20 can include multiple segments 36 for converging around mandrel 14 and braided layer(s) 32. In the embodiment shown, debulking tool 20 includes two symmetrical "clamshell" segments 36, each with a concave inner surface 38 such that when brought together, defines a cylindrical shape complementary to mandrel 14 and braided layer(s) 32. Accordingly, inner surfaces 38 can correspond to the other shapes of mandrel 14 mentioned above. Once assembled around mandrel 14, debulking tool 20 exerts a compressive force via one or a combination of mechanical or vacuum means to debulk braided layer(s) 32. Debulking tool 20 can further include means for heating braided layer(s) 32 during debulking. Cutting device 22 can be a stationary or rotating blade in one example, used to cut through fibers 28 interconnecting radial braider 16 and a completed layer 32, or a preform of multiple layers 32 to release completed layers 32 from radial braider 16. This may be necessary for robotic arm 12 to relocate/reposition mandrel 14 for binder application, debulking, etc. Optical device 24 can be used to inspect braided layer(s) 32 for defects in the braid pattern, braid angle, thickness, etc. at any point, or at multiple points during the preforming process.

Each of applicator 18, debulking tool 20, cutting device 22, and optical device 24 can be operated via automation. Applicator 18 and optical device 24 can be stationary, or translatable in at least one direction via a robotic arm, gantry, or other means of movement. Cutting device 22 can be translatable, for example, along the z-axis via (e.g., robotic arm). Debulking tool 20 can be translatable along the y-axis in the embodiment shown, to move toward and away from mandrel 14, although other movement patterns are contemplated herein. Each of applicator 18, debulking tool 20, cutting device 22, and optical device 24 can further be distributed on two sides of radial braider 16 as shown, or all disposed on a single side in an alternative embodiment. For example, each component can be sequentially moved into a single position with respect to mandrel 14 and/or radial braider 16 depending on the stage of preforming. The collocation of applicator 18, debulking tool 20, cutting device 22, and optical device 24 to radial braider 16 allows for completion of multiple preforming steps in a single physical location with little need for manual intervention to reposition, remove, and/or transfer the preform to multiple locations and/or machines.

A preform of braided layers 32 can subsequently undergo matrix formation and densification using a chemical vapor infiltration (CVI) process to form a CMC component. During densification, the braided layers 32 are infiltrated by reactant vapors, and a gaseous precursor deposits on the ceramic fibers. The matrix material can be SiC or other suitable ceramic material. Densification is carried out until the resulting CMC has reached the desired residual porosity. Typically, one or several interface coatings (e.g., of boron nitride-BN) are deposited prior to the matrix to ensure that the composite fails in a non-brittle manner. In an alternative embodiment, densification can include additional and/or alternative methodologies such as, but not limited to, melt infiltration (MI) and polymer infiltration and pyrolysis (PIP).

A CMC component formed with the disclosed automated system can be incorporated into aerospace, maritime, or industrial equipment, to name a few, non-limiting examples.

Discussion of Possible Embodiments

The following are non-exclusive descriptions of possible embodiments of the present invention.

A system for forming a braided preform includes a mandrel having a rotational axis, the mandrel being translatable along and rotatable about the rotational axis, a radial braider for winding fibers onto the mandrel to form a braided layer, an applicator for applying a polymer binder to the braided layer while mounted on the mandrel, and a debulking tool for debulking the braided layer while mounted on the mandrel.

The system of the preceding paragraph can optionally include, additionally and/or alternatively, any one or more of the following features, configurations and/or additional components:

The above system can further include a robotic arm for translating and rotating the mandrel.

Any of the above systems can further include a guide rail for translating and rotating the mandrel.

In any of the above systems, the radial braider can further include a guide ring for guiding the fibers onto the mandrel.

In any of the above systems, the fibers can be formed from silicon carbide.

In any of the above systems, the applicator can be a bath containing the polymer binder.

In any of the above systems, the polymer binder can include one of polyvinyl alcohol and polyvinyl butyral.

In any of the above systems, the polymer binder can further include ceramic particles formed from at least one of silicon carbide, boron carbide, silicon nitride, pure silicon, pure carbon, aluminum oxide, and hafnia.

In any of the above systems, the debulking tool can include two segments having inner surfaces complementary to an outer surface of the mandrel.

In any of the above systems, each segment can be translatable along an orthogonal axis relative to the rotational axis to converge on the mandrel.

In any of the above systems, the debulking tool can be configured to apply pressure and heat to the braided layer mounted on the mandrel.

Any of the above systems can further include a cutting device for cutting fibers interconnecting the radial braider to and the braided layer.

Any of the above systems can further include an optical device for inspecting the braided layer.

A method of forming a ceramic matrix composite includes winding a plurality of fibers from a radial braider around a mandrel to form a braided layer, cutting the plurality of fibers to release the braided layer from the radial braider, applying a polymer binder to the braided layer while on the mandrel, translating a debulking tool toward the mandrel to converge around the mandrel, and debulking the braided layer.

The system of the preceding paragraph can optionally include, additionally and/or alternatively, any one or more of the following features, configurations and/or additional steps: The above method can further include optically inspecting the braided layer.

Any of the above methods can further include forming a preform with the braided layer.

Any of the above methods can further include densifying preform using one of: chemical vapor infiltration, polymer infiltration and pyrolysis, and slurry infiltration.

A system for forming a braided preform includes a mandrel having a rotational axis, the mandrel being translatable along and rotatable about the rotational axis, a driven device for translating and rotating the mandrel, a radial braider for winding fibers onto the mandrel to form a braided layer, an applicator for applying a polymer binder to the braided layer while mounted on the mandrel, and a debulking tool for debulking the braided layer while mounted on the mandrel.

The system of the preceding paragraph can optionally include, additionally and/or alternatively, any one or more of the following features, configurations and/or additional components:

In the above system, the driven device comprises one of a robotic arm and a translatable guide rail.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for forming a braided preform, the system comprising:
- a mandrel having a rotational axis, the mandrel being translatable along and rotatable about the rotational axis;
- a radial braider for winding fibers onto the mandrel to form a braided layer;
- an applicator for applying a polymer binder to the braided layer while mounted on the mandrel;
- a debulking tool for debulking the braided layer while mounted on the mandrel, wherein:
  - the debulking tool comprises two segments having inner surfaces complementary to an outer surface of the mandrel,
  - each segment of the two segments of the debulking tool is translatable along an orthogonal axis relative to the rotational axis to converge on the mandrel, and
  - the debulking tool is configured to apply pressure and heat to the braided layer mounted on the mandrel;
- a cutting device for cutting fibers interconnecting the radial braider to the braided layer; and
- an optical device for inspecting the braided layer,
- wherein the applicator, the debulking tool, the cutting device, and the optical device are collocated to the radial braider such that each device is operable on the mandrel.

2. The system of claim 1 and further comprising: a robotic arm for translating and rotating the mandrel.

3. The system of claim 1 and further comprising: a guide rail for translating and rotating the mandrel.

4. The system of claim 1, wherein the radial braider comprises: a guide ring for guiding the fibers onto the mandrel.

5. The system of claim 1, wherein the fibers are formed from silicon carbide.

6. The system of claim 1, wherein the applicator is configured to spray or apply droplets of the polymer binder to the braided layer while mounted on the mandrel.

7. The system of claim 1, wherein the applicator is a bath containing the polymer binder.

8. The system of claim 1, wherein the polymer binder comprises one of polyvinyl alcohol and polyvinyl butyral.

9. The system of claim 8, wherein the polymer binder further comprises: ceramic particles formed from at least one of silicon carbide, boron carbide, silicon nitride, pure silicon, pure carbon, aluminum oxide, and hafnia.

10. A system for forming a braided preform, the system comprising:
- a mandrel having a rotational axis, the mandrel being translatable along and rotatable about the rotational axis;
- a driven device for translating and rotating the mandrel;
- a radial braider for winding fibers onto the mandrel to form a braided layer;
- an applicator for applying a polymer binder to the braided layer while mounted on the mandrel;
- a debulking tool for debulking the braided layer while mounted on the mandrel, wherein:
  - the debulking tool comprises two segments having inner surfaces complementary to an outer surface of the mandrel,
  - each segment of the two segments of the debulking tool is translatable along an orthogonal axis relative to the rotational axis to converge on the mandrel, and
  - the debulking tool is configured to apply pressure and heat to the braided layer mounted on the mandrel;
- a cutting device for cutting fibers interconnecting the radial braider to the braided layer; and
- an optical device for inspecting the braided layer,
- wherein the applicator, the debulking tool, the cutting device, and the optical device are collocated to the radial braider such that each device is operable on the mandrel.

11. The system of claim 10, wherein the driven device comprises one of a robotic arm and a translatable guide rail.

12. A method of forming a ceramic matrix composite, the method comprising:
- winding a plurality of fibers from a radial braider around a mandrel to form a braided layer, the mandrel being rotatable about a rotational axis;
- cutting the plurality of fibers to release the braided layer from the radial braider;
- applying a polymer binder to the braided layer while on the mandrel;
- translating a debulking tool toward the mandrel to converge around the mandrel, wherein:
  - the debulking tool comprises two segments having inner surfaces complementary to an outer surface of the mandrel,
  - each segment of the two segments of the debulking tool is translatable along an orthogonal axis relative to the rotational axis to converge on the mandrel, and
- the debulking tool is configured to apply pressure and heat to the braided layer mounted on the mandrel;
- optically inspecting the braided layer while on the mandrel; and
- debulking the braided layer,
- wherein the applying step, the debulking step, the cutting step, and the optically inspecting step are performed with the plurality of fibers on the mandrel.

13. The method of claim 12 and further comprising: forming a preform with the braided layer.

14. The method of claim 13 and further comprising: densifying preform using one of: chemical vapor infiltration, polymer infiltration and pyrolysis, and slurry infiltration.

* * * * *